US010878327B2

United States Patent
Narasappa (10) Patent No.: US 10,878,327 B2
(45) Date of Patent: Dec. 29, 2020

(54) DETECTING ROOT CAUSE FOR TRANSACTION DEGRADATION USING CAUSAL BAYESIAN NETWORKS

(71) Applicant: Appnomic Systems Private Limited, Bangalore (IN)

(72) Inventor: Sumanth Narasappa, Bangalore (IN)

(73) Assignee: Appnomic Systems Private Limited, Bangalore (IN)

( * ) Notice: Subject to any disclaimer, the term of this patent is extended or adjusted under 35 U.S.C. 154(b) by 1012 days.

(21) Appl. No.: 14/475,423

(22) Filed: Sep. 2, 2014

(65) Prior Publication Data
US 2015/0074035 A1    Mar. 12, 2015

(30) Foreign Application Priority Data
Sep. 2, 2013    (IN) .......................... IN3925CHE2013

(51) Int. Cl.
*G06N 7/00*    (2006.01)

(52) U.S. Cl.
CPC ..................... *G06N 7/005* (2013.01)

(58) Field of Classification Search
CPC .......... G06N 5/048; G06N 7/005; G06N 7/04; G06N 99/005; G06N 5/04; G06N 20/00
USPC .......................................................... 706/52
See application file for complete search history.

(56) References Cited

U.S. PATENT DOCUMENTS

| | | | | |
|---|---|---|---|---|
| 6,456,622 B1* | 9/2002 | Skaanning | ............. | G06N 5/025 370/389 |
| 7,379,926 B1* | 5/2008 | Belniak | .................... | G06N 5/00 706/12 |
| 8,015,139 B2* | 9/2011 | Bahl | ..................... | G06N 5/043 706/46 |
| 8,140,454 B2 | 3/2012 | Bullen | | |
| 8,443,074 B2* | 5/2013 | Bahl | ................... | H04L 41/5058 706/46 |
| 8,751,423 B2* | 6/2014 | Pandey | ..................... | F02C 9/00 706/14 |
| 9,104,572 B1* | 8/2015 | Thompson | ............ | G06F 11/079 |

(Continued)

FOREIGN PATENT DOCUMENTS

CN    102143507    8/2011

OTHER PUBLICATIONS

Devitt et al.—"Constructing Bayesian Networks Automatically using Ontologies"—https://pdfs.semanticscholar.org/1a12/71a32932d5b16e27e45940b662581d622bd1.pdf (Year: 2006).*

(Continued)

*Primary Examiner* — Viker A Lamardo
(74) *Attorney, Agent, or Firm* — Van Pelt, Yi & James LLP (57) ABSTRACT

Techniques for detecting root cause for transaction degradation using causal Bayesian networks are disclosed. In some embodiments, various states associated with an application comprising transactions and components are determined, wherein the determined states are associated with the application transactions and components. The determined states are used as input to build a Bayesian network whose nodes represent application transactions and components. A root cause set comprising one or more application components that is associated with a transaction degradation is inferred by traversing the Bayesian network.

48 Claims, 3 Drawing Sheets

(56) References Cited

U.S. PATENT DOCUMENTS

| | | | | |
|---|---|---|---|---|
| 2002/0044296 | A1* | 4/2002 | Skaanning | G06F 11/0733 358/1.14 |
| 2002/0083371 | A1* | 6/2002 | Ramanathan | G06F 11/2294 714/37 |
| 2005/0091227 | A1* | 4/2005 | McCollum | G06F 8/36 |
| 2005/0114494 | A1* | 5/2005 | Beck | G06F 9/542 709/224 |
| 2008/0144663 | A1* | 6/2008 | Johnson | G06N 7/005 370/469 |
| 2009/0181665 | A1* | 7/2009 | Sater | H04L 67/36 455/424 |
| 2011/0282508 | A1* | 11/2011 | Goutard | H02J 3/06 700/293 |
| 2012/0005534 | A1* | 1/2012 | Li | G06F 11/008 714/26 |
| 2012/0136819 | A1* | 5/2012 | Pandey | F02C 9/00 706/14 |
| 2012/0240185 | A1* | 9/2012 | Kapoor | H04L 63/1425 726/1 |
| 2014/0019403 | A1* | 1/2014 | Harrison | G06N 5/02 706/58 |
| 2014/0258187 | A1* | 9/2014 | Suleiman | G06N 99/005 706/12 |
| 2015/0032884 | A1* | 1/2015 | Greifeneder | H04L 67/10 709/224 |
| 2015/0304191 | A1* | 10/2015 | Groenendijk | H04L 41/5032 370/252 |

OTHER PUBLICATIONS

Wang et al.—"A Bayesian Network-Based Knowledge Engineering Framework for IT Service Management"—2014—https://ieeexplore.ieee.org/stamp/stamp.jsp?arnumber=5928314&tag=1 (Year: 2014).*

* cited by examiner

| Time | WebServerA | WebServerB | WebServerC | DBServerD | TxnAlpha | TxnBeta |
|---|---|---|---|---|---|---|
| 2013:05:01 00:00 | Abnormal | Normal | Abnormal | Normal | Normal | Abnormal |
| 2013:05:01 00:01 | Normal | Abnormal | Normal | Abnormal | Abnormal | Normal |
| 2013:05:01 00:02 | Normal | Normal | Normal | Abnormal | Abnormal | Normal |
| .... | .... | .... | .... | .... | .... | .... |

DETECTING ROOT CAUSE FOR TRANSACTION DEGRADATION USING CAUSAL BAYESIAN NETWORKS

CROSS REFERENCE TO OTHER APPLICATIONS

This application claims priority to India Provisional Patent Application No. 3925/CHE/2013 entitled DETECTING ROOT CAUSE FOR TRANSACTION DEGRADATION USING CAUSAL BAYESIAN NETWORKS filed Sep. 2, 2013 which is incorporated herein by reference for all purposes.

BACKGROUND OF THE INVENTION

Finding a root cause when an application transaction slows down or fails can be a difficult task given a distributed deployment of an application as well as a large set of associated components. Various techniques exist for determining the root cause of a transaction degradation. However, existing techniques for determining root cause are each associated with various shortcomings.

One existing technique for determining root cause comprises a rule based approach. In this approach, a pre-defined set of rules is developed for possibly foreseen problems. The rules take in a set of symptoms or states as input and produce a set of root cause candidates or root causes as output. However, developing a comprehensive rule set is difficult. Developing a rich rule set requires a considerable amount of time and domain expertise. Moreover, the rule set needs to be adapted as an associated application changes or evolves over time. Thus, such a rule based approach for determining root cause is not practical for many cases.

Another existing technique for determining root cause comprises sequential pattern mining. In this approach, patterns in system events are identified as they occur. Specifically, this approach involves mining for frequent patterns in a given window of time and finding correlations between events. The correlation to causation conclusion is based on sequences of occurrences of frequent item (event) sets. However, dependencies among the various component variables cannot be inferred using this approach. Moreover, the impact analysis of an event is not always straightforward to determine. A major drawback of this approach is the inability to easily infer impacted application transactions and the corresponding degrees of impact.

Given the shortcomings of existing approaches, improved techniques for determining root causes of application transaction degradations are needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Discovering root cause of an application transaction degradation or failure is a daunting task as an application typically comprises a large set of associated transactions and components that collectively provide the various functionalities of the application. Localizing the cause of transaction slowness or failure is key for application performance monitoring. Techniques for inferring possible root causes of application transaction degradations using Bayesian networks are disclosed herein. As described, the learned network may be further tuned using a feedback loop, e.g., to take into account user feedback and/or to dynamically adapt to changing environments. The network built using the disclosed techniques may moreover be employed for predicting future transaction degradations and failures.

As further described below, the disclosed techniques include learning Bayesian belief networks, which are a special case of probabilistic graphical models. In a probabilistic graphical model, the nodes represent random variables, and the arcs represent conditional independences among the variables. In a causal Bayesian network, the links indicate that parent variables causally influence the values of child variables. A Bayesian network is a directed graph (in most cases, a directed acyclic graph) that encapsulates the joint probability distributions among variables as well as variable interdependencies.

In some embodiments, application states or symptoms are represented as a causal Bayesian network. Specifically, the nodes of the network represent states of transactions, components, and/or of other entities associated with the application. With a Bayesian network, knowledge learned from past behavior may be employed to determine root cause sets as further described herein. The learned network may be tuned (i.e., nodes and/or arcs may be added or removed) based on received feedback. Feedback on raised events and identified root causes may be provided by associated operators. For example, an operator may rate the correlations between events and root causes to improve the learned network. Furthermore, the learned network may be used to study the impacts of component degradations and failures on transactions and predict corresponding effects on transactions in advance. Thus, the causal network also acts as a predictive model for transaction degradation and failure.

Figure 1:
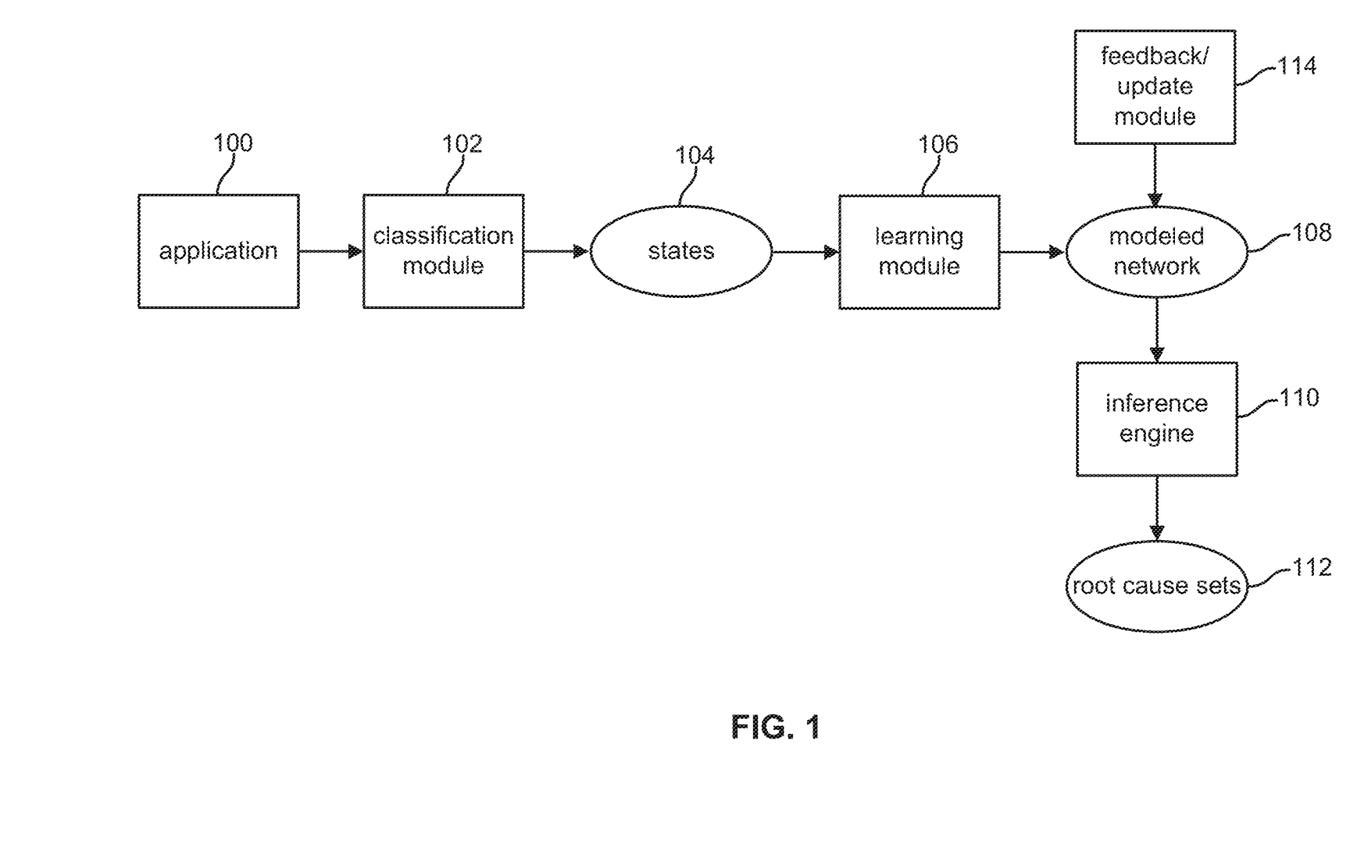
FIG. 1 is a high level block diagram of various parts of a system for determining root causes of transaction degradations based on modeling or representing an application using a Bayesian network.

FIG. 1 is a high level block diagram of various parts of a system for determining root causes of transaction degradations based on modeling or representing an application using a Bayesian network. Block 100 represents an application. Although depicted as a single block, application 100 may comprise any number of interconnected blocks that collectively provide the functionality of the application. Applications such as e-commerce sites and billing applications typically comprise a large number of transactions and components and may be associated with one or more external entities. Examples of application transactions include searching, booking, reservation processing, report generation, etc. Examples of application components include a host server, web server, application server, database, etc. Examples of external entities include a payment gateway, a third party web service, etc. Specifically, a transaction is a unit of work that achieves a prescribed domain function, and a component is a resource that is used by a transaction to get work done. For example, a database server is a component that facilitates data to be managed (e.g., stored, organized, queried, etc.), and the data is hosted by a server that provides essential resources (e.g., CPU, memory, network connectivity) for a unit of work (i.e., a transaction) to be accomplished.

Block 102 represents a set of one or more classification modules for determining and classifying the states of various parts of application 100. Metrics associated with an application or parts thereof are measured to give insights into the performance and behavior of the application. Such metrics are referred to herein as Key Performance Indicators (KPIs). States may be measured, for example, via polling, i.e., capturing KPIs at prescribed intervals. Based on prescribed thresholds, a KPI value measured during a given interval may be mapped to a state such as 'Normal', 'Warning', or 'Abnormal'. Examples of transaction KPIs include response time and volume (i.e., load). Component KPIs are specific to an associated system and may comprise load KPIs that represent the load induced on the system (e.g., transaction volume) and behavior KPIs that reflect system state (e.g., resource usage). In addition to performance KPIs, an availability of a component may also be mapped to a state, e.g., 'Available' or 'Not Available'. In some embodiments, block 102 comprises one or more anomaly detection modules that facilitate detecting anomalous states of various parts of the application. The output of block 102 comprises states 104 of application 100.

Block 106 represents a set of one or more learning modules that take states 104 as input to form and output a modeled network 108. In some embodiments, network 108 comprises a (causal) Bayesian network. Block 110 represents an inference engine configured to traverse input network 108 to determine and output one or more root cause sets 112. Block 114 represents a feedback/update module configured to adjust network 108 and, in turn, the root cause sets 112 identified by inference engine 110. For example, feedback module 114 may adjust network 108 to take into account changes in application 100 as it evolves. In some cases, input into feedback module 114 to adjust network 108 is received from an operator, administrator, and/or domain expert.

Figure 2:
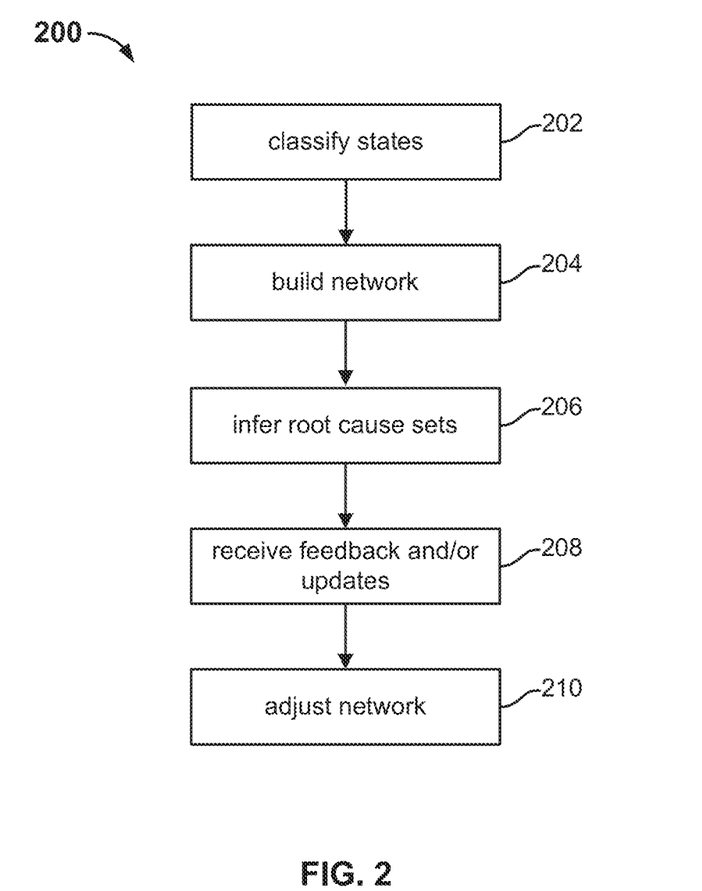
FIG. 2 is a flow chart illustrating an embodiment of a process for determining root causes of transaction degradations based on modeling or representing an application using a Bayesian network.

FIG. 2 is a flow chart illustrating an embodiment of a process for determining root causes of transaction degradations based on modeling or representing an application using a Bayesian network. Process 200 starts at step 202 at which the states of an application or various parts thereof are classified. Any one or more algorithms may be employed to infer system state. In some embodiments, various anomaly detection techniques are employed to determine state. In some such cases, for instance, measured KPI values are mapped to states such as 'Normal', 'Warning', or 'Abnormal' based on thresholds set by corresponding anomaly detection algorithms. Moreover, states may be measured at prescribed times instances, i.e. polling intervals. The system states that are classified at step 202 may correspond to transactions, components, and/or other entities associated with an application under consideration.

To detect transaction abnormality with respect to response time, for example, non-parametric methods (e.g., IQR, modified Z-score based on median, etc.) may be applied on the response time set to detect outliers in the data over an interval (e.g., one minute). Other techniques based on relative entropy and/or density estimation may also be applied to detect transaction anomalies. Similar techniques for detecting anomalies in component KPIs may be employed to determine component states. As an example, consider a booking transaction that receives a normal load, but forty percent of transactions is found to be slow. In this example, transaction slowness would be inferred by an outlier detection algorithm, and the state of the transaction would be classified as 'Abnormal'. Similarly, an underlying database server may have state 'Abnormal' due to the KPI 'Lock Wait' being an extreme value.

Figure 3A:
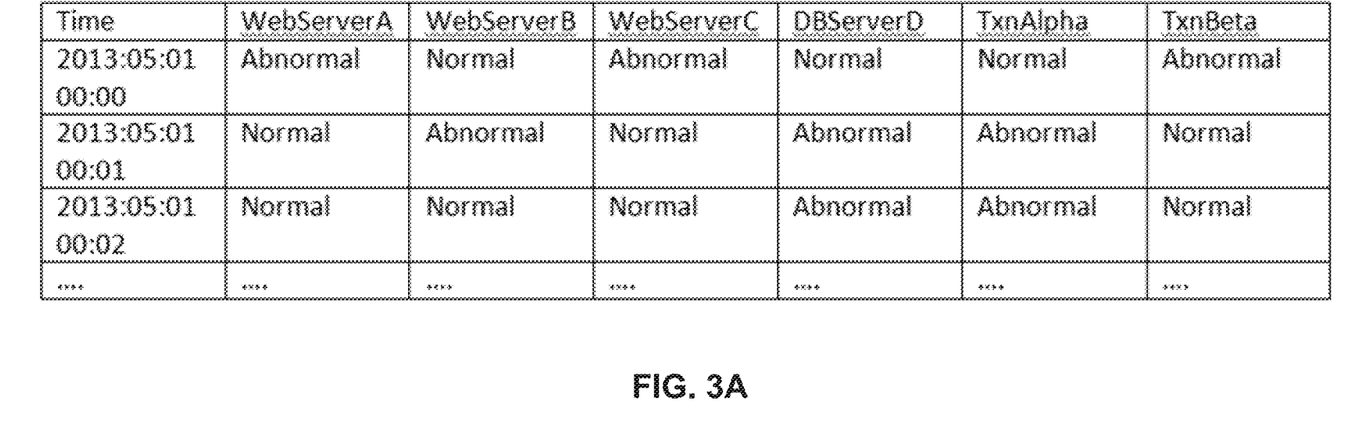
FIG. 3A illustrates an example of a state matrix comprising training data.

At step 204, a model or network is built. In some embodiments, the network comprises a (causal) Bayesian network. The input to building the network comprises a set of symptoms or states of an application or system under consideration. The application state for a given polling interval comprises the various states of the transactions, components, and/or other entities comprising the application. Specifically, for each polling interval, for each system, a state is determined at step 202 that acts as an input to the Bayesian learning network built at step 204. An advantage of using discrete variables (states) to learn the network structure is reduced computational complexity. Any duration of data may be used to learn the network. For example, one to three weeks' worth of data may be used to build the network. An example of a state matrix comprising training data is provided in FIG. 3A.

During the building of the training data, a threshold for strength (e.g., based on p-value) may be set between two nodes (arc). In some such cases, an arc is only drawn if the strength exceeds a threshold. The built causal network serves as a blueprint for finding related components and dependent transactions. Example algorithms used in learning the structure of the network include search and score with hill climbing, Tabu search, simulated annealing, genetic search, etc. The structure learning may also be based on conditional independence tests that learn the causal structure. The built network is stored as a graph comprising transactions and components as nodes.

Figure 3B:
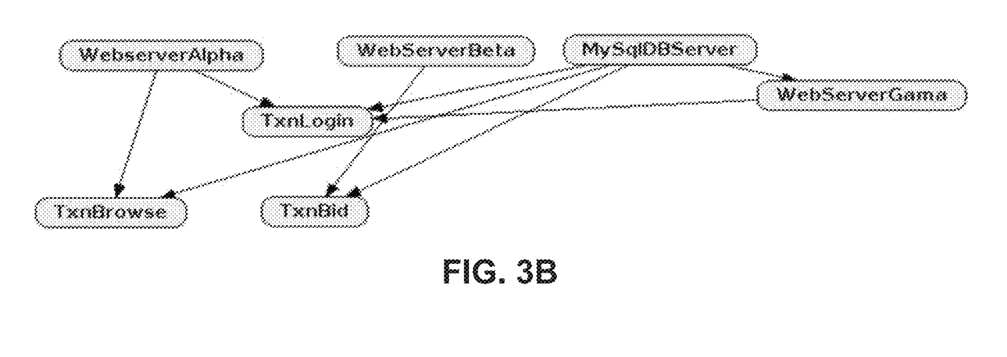
FIG. 3B illustrates an example of a simple causal Bayesian network.

FIG. 3B provides an example of a simple causal Bayesian network comprising seven nodes representing components and transactions. In the case of causal networks, parents influence child nodes. In the given example, for instance, transaction 'TxnLogin' degrades when 'WebserverAlpha' experiences performance issues and transaction 'TxnBid' degrades if database server 'MySqlDBServer' and/or 'WebServerBeta' degrade.

At step 206, root cause sets are inferred from the graphical model built at step 204. That is, the Bayesian network is traversed to find dependent nodes and their states to infer root cause sets from the training data used to the build the network. For example, for a transaction that is slow, a root cause set may comprise components that were also in an abnormal state based on dependencies inferred by traversing the Bayesian network. In some cases, given a root cause set, the current state and the modeled state may be inferred so that only matching components are selected to form a final root cause set. Any one or more appropriate techniques, a few of which are described below, may be employed to identify root cause sets at step 206.

In some embodiments, on event of a transaction degradation (i.e., a transaction has slowed or failed), a possible set of dependent components is selected for further analysis. In some such cases, those dependent components that are in anomalous states over the past three polling intervals are identified as a corresponding root cause set. Such an approach avoids searching of an entire component set for possible components that might have an impact. In this example, states from the last three polling intervals are considered since component degradation may not immediately result in transaction degradation, but in a few intervals of time component degradation may show its effect on transaction performance. In various embodiments, the query for states is not limited to only three intervals but may be any number of intervals.

Another approach includes querying the built network for a possible root cause set. In such cases, the entire state matrix of components and transactions is considered, and a query on the network scores transactions and components based on the structure of the network. A threshold value may be set on the scores to eliminate those components with the least scores, leaving a set comprising only possible root cause components. The network helps in selecting a subset of components for root cause analysis from a larger space set of components. As an example, consider a transaction A with parent nodes database D and gateway G. In this example, a resulting symptom set (evidence) from querying the network comprises A, G, and S (on which the transaction is not dependent). A conditional probability for A|G is a positive value greater than that of A|S, which may be zero. Thus, in this example, the root cause conclusion is that transaction A failed because gateway G degraded.

In yet another approach, root cause analysis includes identifying KPI violations to determine components responsible for transaction degradation. In some such cases, spikes or abrasions in component KPIs are detected. Spike detection, for example, may involve KPI measurements from a prescribed number (e.g., three-five) of previous polling intervals and determining whether a KPI value has deviated beyond a statistical limit (e.g., $3\sigma$) or beyond a predefined threshold (e.g., a 20% change in value). Thus, a component with one or more abnormal KPI values may be identified as a root cause of a transaction. In some cases, a spike detector may score a KPI value based on its degree of deviation. In such cases, a maximum score of a component KPI is considered the score of the component. Components found to have the highest scores during anomaly detection of associated KPIs may be identified as a root cause set.

At step 208, feedback regarding the network and/or identified root cause sets is optionally received. In some embodiments, the network is presented to a domain expert (e.g., an application owner or maintainer who has in-depth knowledge of the application structure and deployment) for fine tuning. Such a domain expert, for instance, may fine tune dependencies (arcs) and/or edit the node set (e.g., nodes may be added or deleted). In some cases, a new entity may be added as a new node that is not yet discovered by the network. Arc strength may also be input, for example, on a scale of 1 to 10, which may be translated to probability values between 0 and 1. Feedback may also be received with respect to the root cause sets automatically identified at step 206. In some cases, such feedback indicates accuracy of an identified root cause set. A domain expert may remove components from a root cause set or add components that were omitted. Thus, domain expert knowledge may be incorporated to improve an automatically built model, making the approach semi-supervised. The network is adjusted at step 210 according to the feedback received at step 208 as applicable.

In some embodiments, operator feedback may be received at step 208 and the network accordingly adjusted at step 210 during actual operation. For example, an operator may be presented an identified root cause set for consideration when an event is raised. In some such cases, the operator may provide feedback about usefulness by rating the event and associated root cause set. Each component that is a part of the root cause set may be scored or rated based on its contribution to determining the exact root cause. For instance, the scoring scale may comprise values from one to ten, with one being not root cause component and ten being root cause component. In the cases in which no root causes are found and/or no root causes are found that match operator expectation, the operator may be prompted to enter possible components as root cause. Such feedback may be further analyzed to include the components and the relationships to the transaction into the learned network. Thus, various forms of manual feedback may be used to further refine or fine tune the network at step 210.

An application may change or evolve over time. In some cases, information related to application changes is received at step 208, and the network is accordingly updated at step 210 to accommodate the changes. For example, an e-commerce site running a promotion may expect more volume on particular transactions. In such cases, a new component set may be provisioned to accommodate the larger volume and load. This may be accommodated in the network by creating a new dependency set or by allowing the model to continuously learn. In another example, changes arising during application maintenance may need to be accommodated in the network. During component maintenance, for instance, a backup may be in action or there may be no backup. In such cases, a backup state may be fed in as the state of the actual component, or a new node with appropriate dependencies may be included in the network.

The built network may be used as a predictive model. A causal network may be used to determine how changes in parent nodes affect child nodes, i.e., how changes in components affect changes to dependent transactions. For example, a state matrix (evidence) in a current interval may be fed into the network, and for each node a score may be computed that indicates the probable occurrence of an event (e.g., the state being abnormal). Impending degradation or failure may be predicted for components and transactions that have values greater than a prescribed threshold for the state 'Abnormal'. Thus, the learned network may be used as a predictive model to predict failing transactions along with the possible root cause set. As an example, a set of database servers might go into abnormal states, but transactions in the given interval might still be working without showing any symptoms of degradation but will soon degrade. Such degradation can be predicted in advance using the learned network by feeding the symptoms (evidence) into the network and computing scores to identify transactions that would be impacted.

As described, many advantages exist in modeling an application using a Bayesian network. Learning transaction dependencies to components and the strengths of the dependencies facilitates identifying root cause sets. A learned network may be used as a predictive model to predict impending transaction degradations. The model improves and evolves over time as adjustments or updates are made to the model based on user feedback as well as continued learning to account for dynamic changes in application behavior.

Several techniques have been described with respect to the given examples. Such techniques may be similarly employed with respect to many other embodiments and variations. For example, a similar model may be employed for transaction to method response time in order to infer a transaction degradation and a method set as root causes. In a system in which method response times are monitored and transaction times are monitored, both may be input into a Bayesian model to learn the causal structure of the network. In many of the given examples, the described model assumes system states as input. However, an even more granular network may be built with KPIs and transaction states as nodes of the network. Such a network is based on the probability distributions of the various KPIs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        determine states associated with an application comprising transactions and components that collectively provide functionalities of the application, wherein the determined states are associated with the application transactions and components and wherein each application transaction comprises a unit of work associated with the application and each application component comprises a resource that is used by one or more application transactions to get work done;
        build a Bayesian network using the determined states as input, wherein transaction states used as input to build the Bayesian network are based at least in part on response times of application transactions, component states used as input to build the Bayesian network are based at least in part on transaction volumes experienced by application components and resource usages of application components, parent nodes of the Bayesian network correspond to application components, child nodes of the Bayesian network correspond to application transactions, and links of the Bayesian network indicate one or more application components used as resources by application transactions to achieve prescribed domain functions of the application;
        tune the Bayesian network using a feedback loop, wherein tuning includes adjusting either or both nodes and dependencies of the Bayesian network; and
        determine a root cause set associated with a transaction degradation from the Bayesian network, wherein the root cause set comprises one or more components of the application that cause the transaction degradation; and
    a memory coupled to the processor and configured to provide the processor with instructions.

2. The system of claim 1, wherein adjusting nodes and dependencies includes either or both of adding and removing nodes and dependencies in the Bayesian network.

3. The system of claim 1, wherein adjusting dependencies comprises adjusting arc strengths.

4. The system of claim 1, wherein to determine states associated with the application comprises to measure metrics associated with application transactions and components and to map measured metrics to states based on thresholds.

5. The system of claim 1, wherein to determine states associated with the application comprises to determine states at prescribed polling intervals.

6. The system of claim 1, wherein to determine states associated with the application comprises to determine states using one or more anomaly detection algorithms.

7. The system of claim 1, wherein to determine the root cause set associated with the transaction degradation comprises to identify related application components on which the degraded transaction depends.

8. The system of claim 1, wherein to determine the root cause set associated with the transaction degradation comprises to detect the transaction degradation and include in the root cause set dependent components that are in anomalous states at one or more previous polling intervals.

9. The system of claim 1, wherein to determine the root cause set associated with the transaction degradation comprises to query the Bayesian network for the root cause set.

10. The system of claim 1, wherein the root cause set comprises components with anomalous KPIs (key performance indicators).

11. The system of claim 1, wherein to tune the Bayesian network using the feedback loop comprises to receive feedback regarding the Bayesian network from a domain expert.

12. The system of claim 1, wherein the processor is further configured to receive feedback regarding the determined root cause set from a domain expert.

13. The system of claim 1, wherein to tune the Bayesian network using the feedback loop comprises to update the Bayesian network based on operator feedback.

14. The system of claim 1, wherein adjusting dependencies comprises adjusting arc strengths and wherein arc strengths comprise probability values.

15. The system of claim 1, wherein the Bayesian network comprises a causal network.

16. The system of claim 1, wherein the processor is further configured to predict impending transaction degradations and associated root cause sets using the Bayesian network.

17. A method, comprising:
    determining states associated with an application comprising transactions and components that collectively provide functionalities of the application, wherein the determined states are associated with the application transactions and components and wherein each application transaction comprises a unit of work associated with the application and each application component comprises a resource that is used by one or more application transactions to get work done;

building a Bayesian network using the determined states as input, wherein transaction states used as input to build the Bayesian network are based at least in part on response times of application transactions, component states used as input to build the Bayesian network are based at least in part on transaction volumes experienced by application components and resource usages of application components, parent nodes of the Bayesian network correspond to application components, child nodes of the Bayesian network correspond to application transactions, and links of the Bayesian network indicate one or more application components used as resources by application transactions to achieve prescribed domain functions of the application;

tuning the Bayesian network using a feedback loop, wherein tuning includes adjusting either or both nodes and dependencies of the Bayesian network; and determining a root cause set associated with a transaction degradation from the Bayesian network, wherein the root cause set comprises one or more components of the application that cause the transaction degradation.

18. The method of claim 17, wherein adjusting dependencies comprises adjusting arc strengths.

19. The method of claim 17, further comprising predicting impending transaction degradations and associated root cause sets using the Bayesian network.

20. A computer program product embodied in a non-transitory computer readable storage medium and comprising computer instructions for:

determining states associated with an application comprising transactions and components that collectively provide functionalities of the application, wherein the determined states are associated with the application transactions and components and wherein each application transaction comprises a unit of work associated with the application and each application component comprises a resource that is used by one or more application transactions to get work done;

building a Bayesian network using the determined states as input, wherein transaction states used as input to build the Bayesian network are based at least in part on response times of application transactions, component states used as input to build the Bayesian network are based at least in part on transaction volumes experienced by application components and resource usages of application components, parent nodes of the Bayesian network correspond to application components, child nodes of the Bayesian network correspond to application transactions, and links of the Bayesian network indicate one or more application components used as resources by application transactions to achieve prescribed domain functions of the application;

tuning the Bayesian network using a feedback loop, wherein tuning includes adjusting either or both nodes and dependencies of the Bayesian network; and determining a root cause set associated with a transaction degradation from the Bayesian network, wherein the root cause set comprises one or more components of the application that cause the transaction degradation.

21. The method of claim 17, wherein adjusting nodes and dependencies includes either or both of adding and removing nodes and dependencies in the Bayesian network.

22. The method of claim 17, wherein determining states associated with the application comprises measuring metrics associated with application transactions and components and mapping measured metrics to states based on thresholds.

23. The method of claim 17, wherein determining states associated with the application comprises determining states at prescribed polling intervals.

24. The method of claim 17, wherein determining states associated with the application comprises determining states using one or more anomaly detection algorithms.

25. The method of claim 17, wherein determining the root cause set associated with the transaction degradation comprises identifying related application components on which the degraded transaction depends.

26. The method of claim 17, wherein determining the root cause set associated with the transaction degradation comprises detecting the transaction degradation and including in the root cause set dependent components that are in anomalous states at one or more previous polling intervals.

27. The method of claim 17, wherein determining the root cause set associated with the transaction degradation comprises querying the Bayesian network for the root cause set.

28. The method of claim 17, wherein the root cause set comprises components with anomalous KPIs (key performance indicators).

29. The method of claim 17, wherein tuning the Bayesian network using the feedback loop comprises receiving feedback regarding the Bayesian network from a domain expert.

30. The method of claim 17, further comprising receiving feedback regarding the determined root cause set from a domain expert.

31. The method of claim 17, wherein tuning the Bayesian network using the feedback loop comprises updating the Bayesian network based on operator feedback.

32. The method of claim 17, wherein adjusting dependencies comprises adjusting arc strengths and wherein arc strengths comprise probability values.

33. The method of claim 17, wherein the Bayesian network comprises a causal network.

34. The computer program product of claim 20, wherein adjusting nodes and dependencies includes either or both of adding and removing nodes and dependencies in the Bayesian network.

35. The computer program product of claim 20, wherein adjusting dependencies comprises adjusting arc strengths.

36. The computer program product of claim 20, wherein determining states associated with the application comprises measuring metrics associated with application transactions and components and mapping measured metrics to states based on thresholds.

37. The computer program product of claim 20, wherein determining states associated with the application comprises determining states at prescribed polling intervals.

38. The computer program product of claim 20, wherein determining states associated with the application comprises determining states using one or more anomaly detection algorithms.

39. The computer program product of claim 20, wherein determining the root cause set associated with the transaction degradation comprises identifying related application components on which the degraded transaction depends.

40. The computer program product of claim 20, wherein determining the root cause set associated with the transaction degradation comprises detecting the transaction degradation and including in the root cause set dependent components that are in anomalous states at one or more previous polling intervals.

41. The computer program product of claim 20, wherein determining the root cause set associated with the transaction degradation comprises querying the Bayesian network for the root cause set.

42. The computer program product of claim 20, wherein the root cause set comprises components with anomalous KPIs (key performance indicators).

43. The computer program product of claim 20, wherein tuning the Bayesian network using the feedback loop comprises receiving feedback regarding the Bayesian network from a domain expert.

44. The computer program product of claim 20, further comprising computer instructions for receiving feedback regarding the determined root cause set from a domain expert.

45. The computer program product of claim 20, wherein tuning the Bayesian network using the feedback loop comprises updating the Bayesian network based on operator feedback.

46. The computer program product of claim 20, wherein adjusting dependencies comprises adjusting arc strengths and wherein arc strengths comprise probability values.

47. The computer program product of claim 20, wherein the Bayesian network comprises a causal network.

48. The computer program product of claim 20, further comprising computer instructions for predicting impending transaction degradations and associated root cause sets using the Bayesian network.

* * * * *